United States Patent [19] [11] 3,878,124
Durand et al. [45] Apr. 15, 1975

[54] OLEFIN POLYMERIZATION CATALYSTS AND METHOD FOR PREPARATION OF SAME

[75] Inventors: Daniel Durand; Michel Avaro; Pierre Mangin, all of Martigues, France

[73] Assignee: Naphtachimie, Paris, France

[22] Filed: June 23, 1972

[21] Appl. No.: 265,652

[30] Foreign Application Priority Data
June 30, 1971 France .............................. 71.23862

[52] U.S. Cl. ..... 252/429 B; 252/431 R; 260/88.2 R; 260/93.7; 260/94.9 C; 260/94.9 E
[51] Int. Cl. .............................................. B01j 11/84
[58] Field of Search ..................... 252/429 B, 431 R

[56] References Cited
UNITED STATES PATENTS

| 2,927,105 | 3/1960 | Nienburg et al. | 252/429 B X |
| 2,936,302 | 5/1960 | Jones et al. | 252/429 B X |
| 3,072,630 | 1/1963 | de Jong et al. | 252/429 B X |
| 3,097,246 | 7/1963 | Favis | 252/429 B X |
| 3,101,328 | 8/1963 | Edmonds | 252/429 B X |
| 3,136,824 | 6/1964 | Favis | 252/429 B X |
| 3,354,139 | 11/1967 | Vandenberg | 252/429 B X |
| 3,472,910 | 10/1969 | Favis | 252/429 B X |

*Primary Examiner*—Patrick P. Garvin

[57] ABSTRACT

In the polymerization or co-polymerization of olefins having the general formula $CH_2 = CHR$, the use of a catalyst formed of magnesium compounds and compounds of transition metals of sub-groups IVa, Va and VIa of the periodic table of elements prepared by the reaction of organo-magnesium compounds, monohalogenated hydrocarbons and halogenated organic derivatives of the transition metals in a valency of at least 4 and which may include a co-catalyst in the form of an organo-metallic compound of the metals of groups II and III of the periodic table of elements.

5 Claims, No Drawings

OLEFIN POLYMERIZATION CATALYSTS AND METHOD FOR PREPARATION OF SAME

The present invention relates to new catalysts for the polymerization of olefins. These catalysts are particularly suitable for polymerization or co-polymerization of olefins having the formula $CH_2 = CHR$, in which R is a hydrogen atom or an alkyl radical having up to 8 carbon atoms, for the preparation of polymers or co-polymers having a molecular weight which is generally higher than 50,000. These catalysts are particularly suitable for the polymerization or co-polymerization of ethylene.

It is known to polymerize olefins, such as ethylene, by means of a catalytic system comprising on the one hand a catalyst formed by a transition metal compound and on the other hand, a co-catalyst comprising an organo-aluminum compound, such as a trialkylaluminum or an alkylaluminum chloride. For carrying out polymerization operations of this type, it has already been proposed that the catalyst used should be a compound obtained by the reduction, as by means of an organo-magnesium compound, of a compound of a transition metal in which the metal is in a state of high valency. The resulting catalysts have a degree of activity which is higher than that of the catalysts produced by the reduction of transition metal compounds by means of reducing agents other than organo-magnesium compounds. It has been observed, however, that, even under conditions of strictly controlled preparation, it was difficult to produce catalysts of constant composition. This insufficiency of reproducibility is obviously a disadvantage in the industrial use of the catalysts.

It has now been found that it is possible to produce in a highly reproducible manner, catalysts having an even higher degree of activity in the polymerization of compounds, starting from compounds of transition metals and organo-magnesium compounds, and it is an object of this invention to provide a method and means for accomplishing the same.

The invention therefore relates to catalysts which can be used for the polymerization of olefins, essentially comprising compounds of magnesium and transition metals of sub-groups IVa, Va and VIa of the periodic table of elements, said catalysts being prepared by the reaction of organo-magnesium compounds, monohalogenated hydrocarbons and halogenated and/or organic derivatives of said transition metals taken in a state of valency which is at least equal to four.

The transition metals of sub-groups IVa, Va and VIa of the periodic table of elements, as referred to in the preceding paragraph, comprise titanium, vanadium, chromium, zirconium, niobium, molybdenum, hafnium, tantalum, tungsten, thorium and uranium.

The transition metal derivatives correspond to the general formula $Me\ X_{n-m}Y_m$, wherein Me is the transition metal, X is a halogen atom, generally chlorine, Y is an organic group such as an alkoxy radical, n is the mean valency of the transition metal, which is at least equal to 4, and m is a number or fraction within the range of 0 to the value of n.

These transition metal derivatives advantageously comprise compounds of tetravalent titanium, having the general formula $TiX_{4-m}(OR)_m$, in which X represents a halogen, generally chlorine, R is an alkyl radical which can contain from 2 to 8 carbon atoms, and m is an integer or a fraction which can be of any value from 0 to 4. Compounds corresponding to the above formula, in which m is different from 0 and from 4, can be produced from calculated amounts of a titanium tetrahalide, having the formula $TiX_4$, and an alkyl tetratitanate, having the formula $Ti(OR)_4$, in accordance with a functional interchange reaction which can be written as follows:

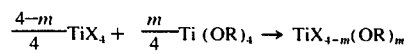
$$\frac{4-m}{4}TiX_4 + \frac{m}{4}Ti(OR)_4 \rightarrow TiX_{4-m}(OR)_m$$

The transition metal derivative can also be selected from vanadium halides such as vanadium tetrachloride $VCl_4$, vanadium tetrabromide, $VB_{r3}$, vanadium oxytrichloride, $VOCl_3$ or vanadium oxytribromide $VOB_{r3}$.

The catalysts according to the invention can be prepared from a wide variety of organo-magnesium compounds. These are produced in any known manner and, preferably, in accordance with the method of Grignard which comprises reacting magnesium in the metal state and an organic monohalogenated derivative having the formula $R'—X$, in which $R'$ represents an alkyl group, and X represents a halogen, generally chlorine or bromine. The Grignard reaction is most frequently performed in the presence of substantial amounts of an etheroxide, such as ethyl oxide. The mixed organo-magnesium compounds, the formula of which is generally written in conventional manner in the form $R'—Mg—X$, then comprise etherates dissolved in an excess of the ether-oxide. These organo-magnesium compounds which are solvated by the ether-oxide can then be used directly in the preparation of the catalysts according to the invention. They can also be used, after having first been freed from the ether-oxides which solvate them, for example by heating.

The organo-magnesium compounds can also be prepared directly in a substantially non-solvated form, by reaction of the metal magnesium and an alkyl halide. This reaction is carried out in a non-polar solvent, such as a liquid hydrocarbon, and in the absence of substantial amounts of polar compounds, such as ether-oxides, which are liable to solvate the organo-magnesium compounds. The reaction can be initiated by means of catalytic amounts of iodine and possibly by a little ether-oxide, such as ethyl oxide. The substantially non-solvated organo-magnesium compounds produced are generally slightly soluble in the solvent in which they have been prepared, and they are consequently in the form of suspensions, and can be used in that form or after having been separated from the solvent.

The catalysts according to the invention can also be prepared from organo-magnesium compounds corresponding to the formula $R'-Mg-R''$, in which $R'$ and $R''$ are alkyl radicals. These compounds, which are currently referred to as symmetrical organo-magnesiums, can be produced, for example, from organo-lithium compounds, in accordance with one of the following two reactions:

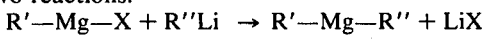
$$R'—Mg—X + R''Li \rightarrow R'—Mg—R'' + LiX$$

or

$$2R'—Li + MgX_2 \rightarrow R'—Mg—R' + 2\ LiX$$

The symmetrical organo-magnesium compounds can also be prepared from mixed organo-magnesium compounds, in accordance with the reaction:

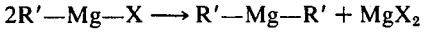
$$2R'—Mg—X \longrightarrow R'—Mg—R' + MgX_2$$

The symmetrical organo-magnesium compounds can then be isolated, after separation of the magnesium or lithium halides that are formed. They generally have little solubility in non-polar solvents, unless they are solvated by ether-oxides.

The monohalogenated hydrocarbons correspond to the general formula R'''-X, in which X represents a chlorine or a bromine atom. The radical R''' can be identical to or different from the groups R' or R'' of the organo-magnesium groups.

In order reproducibly to produce catalysts of high activity, it is preferable to react amounts of the different reactants such that:

the ratio between the number of atoms of the transition metal and the number of magnesium atoms of the organo-magnesium compounds is equal to or less than 0.33 and preferably within the range of 0.25 to 0.33. This condition can be expressed in the following form:

Me/Mg $\leq$ 0.33 and preferably 0.25 < Me/Mg < 0.33 the ratio between the number of organic radicals of the monohalogenated hydrocarbons and the number of organic radicals of the organo-magnesium compounds is equal to or greater than 1 and preferably within the range of 1 to 2. This condition can be expressed in the following form:

R'''/R'+R'' $\geq$ 1 and preferably 1 < R'''/R'+R''< 2

The catalysts according to the invention are advantageously prepared in inert solvents which constitute a heat store and which accordingly provide for greater uniformity of the reaction. Aliphatic hydrocarbons, such as n-heptane or mixtures of hydrocarbons of petroleum origin, are particularly suitable. The amount of solvent used can vary over a wide range. In practice, it is convenient to use amounts of inert solvents such that the reacton medium contains an amount within the range of 10 to 500 g of magnesium per liter.

Preparation of the catalysts, according to the invention, can be carried out in accordance with different operating methods. In one of these methods, the different reactants are introduced into an inert solvent, at a temperature which is insufficient to initiate the reaction. The reaction mixture is then heated with agitation so as to cause the reaction to start, and then maintained at a temperature which is sufficient for the reaction to continue, generally at a temperature within the range of −20° to 150°C, over a period of a few minutes to a few hours, until the transition metal derivative disappears quite completely in the solvent. In another method, the various reactants, except either for the organo-magnesium compound or the monohalogenated hydrocarbon, are introduced into the inert solvent; the mixture is then heated with agitation to a temperature which is sufficient to initiate the reaction, the other reactant being introduced progressively into the reaction medium and the reaction then being continued as before.

The catalysts, according to the invention, occur in the form of solid, finely divided substances which can be washed several times by solvents, such as aliphatic hydrocarbons, until virtually all of the halogenated hydrocarbons are removed in the washing solvents, as indicated by the absence of halogenated compounds in the wash. The resulting catalysts can be preserved in a dry condition or preferably, in suspension in the last charge of washing solvent.

It is important that, during preparation and preservation, the catalysts are protected from air and/or humidity.

Analysis of the resulting catalysts shows that they contain magnesium compounds which do not have the reducing properties of the organo-magnesium compounds. They also contain reduced transition metal compounds. When the transition metals comprise titanium, it is substantially in the trivalent state.

The composition of the catalysts can be varied within fairly wide limits, depending on the nature and the amount of the different reactants used. It has been noticed, however, that catalysts produced under predetermined conditions could be reproduced without difficulty in the course of subsequent operations.

The resulting catalysts can be used for the polymerization or co-polymerization of olefins, such as ethylene and/or olefins having the formula $CH_2 = CHR$, in which R represents an alkyl radical having from 1 to 8 carbon atoms.

In this type of polymerization, the catalysts of this invention are preferably associated with co-catalysts which are selected from organo-metallic compounds of the metals of groups II and III of the periodic table of elements, such as organo-aluminum compounds having the mean formula $AlZ_nX_{3-n}$, in which X represents hydrogen and/or an alkyl group having from 1 to 8 carbon atoms, X represents a halogen atom, preferably chlorine, and $n$ represents an integer or a fraction which can be of any value from 1 to 3. These co-catalysts are advantageously used in amounts such that the molecular ratio between the metals of groups II and III of the co-catalysts, and the transition metals of sub-groups IVa, Va and VIa of the catalysts, is within the range of 1 to 50.

The catalysts of this invention can be used in particular for the polymerization of olefins in accordance with the so-called "low-pressure" method which generally comprises operating at a pressure lower than 20 bars and a temperature within the range of 40° to 150°C. Polymerization can be effected in a liquid in which the catalyst is dispersed, which liquid can be the liquefied monomer or a saturated aliphatic hydrocarbon. Polymerization can also be effected in gaseous phase, in the absence of any liquid diluent. In the course of the polymerization step, it is possible to act on the mean molecular weight of the polymer formed by means of a chain limiting agent, such as hydrogen in molecular proportions, relative to the olefin to be polymerized, which are generally within the range of 10% to 80%.

Polymerization is stopped when the polymer reaches the desired mean molecular weight, which is generally from 50,000 to 1,000,000. Because of the high degree of activity of the catalysts of the invention, the polymers produced generally contain less than 100 ppm and even frequently less than 50 ppm of transition metals, and they can be used without the necessity to carry out a purification treatment.

EXAMPLE 1 a. Preparation of the catalyst

First, n-butylmagnesium chloride is prepared in a jacketed 5-liter stainless steel reaction vessel provided with a mechanical stirrer, a reflux condenser and a device for heating or cooling by circulating a fluid through the jacket. The following are introduced into the reaction vessel, under a nitrogen atmosphere and at ambient temperature:

21.9 g (900 m.moles) of magnesium in powder form
600 ml of dry n-heptane 83.3 g (900 m.moles) of n-butyl chloride
an iodine crystal The reaction medium is heated to 75°C to initiate the reaction and to maintain the reaction for 2 hours. A suspension of 900 m.moles of n-butylmagnesium chloride in n-heptane is produced.

Still under a nitrogen atmosphere, the suspension of n-butylmagnesium chloride is heated to 75°C and, using a metering pump, a solution of 57 g (300 m.moles) of titanium tetrachloride and 83.3 g (900 m.moles) of n-butyl chloride in 350 ml of n-heptane is progressively introduced over a period of 2 hours. The operation of introducing the above solution being completed, the reaction medium is kept at 75°C with agitation for 1 hour.

The brown-black precipitate obtained is washed several times with n-heptane. The composition of the dry catalyst is as follows (% by weight): Ti: 8.3, Mg: 18.2, Cl: 73.5 b. Polymerization of ethylene

The following are successively introduced, under a nitrogen atmosphere, into a 5-liter stainless steel reaction vessel identical to that described above:

2 liters of n-heptane which is heated at 70°C, then
0.45 g (4 m.moles) of triethylaluminum,
an amount of catalyst corresponding to 0.5 milligramatoms of titanium.

The mixture is heated to 75°C, and hydrogen is introduced into the reaction vessel until the pressure reaches 6 bars, followed by ethylene at a flow rate of 160 g/hour. After 7 hours, 1,120 g of a polyethylene is collected which, without being treated by an alcohol for removing the catalytic residues, contains only 20 ppm (parts per million by weight) of titanium.

The polyethylene has an apparent density of 0.44 g/cm$^3$ and an index of fluidity under a load of 2.16 kg (IF$_2$) of 1.6.

EXAMPLE 2

The operation is under the same conditions as in Example 1, but with different amounts of some reactants, as indicated in Table I. The catalyst produced is subjected to the same test of polymerizing ethylene, as in Example 1. The amount of polymer obtained and the titanium content of the latter are shown in Table I.

EXAMPLE 3

Operation is as in Example 1, except that the n-butyl magnesium chloride is prepared in the presence of 25 ml of ethyl oxide.

The results obtained in the polymerization of ethylene are shown in Table I.

EXAMPLE 4 a. Preparation of the catalyst

First, n-butylmagnesium chloride is prepared in the same manner as in Example 1(a).

The following are introduced under a nitrogen atmosphere and at ambient temperature into a 1-liter glass reaction vessel provided with a mechanical stirrer, a reflux condenser and a heating or cooling device:

25.65 g (135 m.moles) of titanium tetrachloride
46.25 g (500 m.moles) of n-butyl chloride
n-heptane, up to a volume of 300 ml After raising the mixture to a temperature of 75°C, 46.7 g (400 m.moles) of n-butyl magnesium chloride in suspension in 500 ml of n-heptane is introduced progressively thereinto in 1 hour 30 minutes. The reaction medium is kept under agitation, at 75°C, for 2 hours.

The brown-black precipitate obtained is washed several times with n-heptane. The composition of the dry catalyst is as follows (% by weight): Ti: 8.9; Mg: 18.9, Cl: 72.2 b. Polymerization of ethylene

Operation is as in Example 1(b); 1,050 g of a polyethylene containing 22 ppm of titanium is collected. Its apparent density is equal to 0.32 g/cm$^3$ and its index of fluidity under a load of 2.16 kg is 1.6.

EXAMPLE 5 a. Preparation of the catalyst

Ethyl-magnesium chloride is first prepared in a 5-liter stainless steel reaction vessel provided with a mechanical stirrer, a reflux condenser and a device for heating or cooling by circulating fluid, as in a double jacket.

The following are successively introduced at ambient temperature into the reaction vessel, under a nitrogen atmosphere:

24.3 g of magnesium in powder form
300 ml of dry n-heptane
4.5 g of pure ethyl chloride
40 ml of ethyl oxide The reaction begins immediately. A mixture of 64.5 g of ethyl chloride and 200 ml of n-heptane is progressively introduced into the reaction medium. This introduction operation is performed dropwise, so as to keep the reaction medium under slight reflux, at about 20°C. When this operation is completed, the reaction medium is kept under reflux by heating for 2 hours. A suspension of 1 mole of ethyl magnesium chloride in n-heptane is produced.

After the suspension of ethyl magnesium chloride has been raised to a temperature of 60°C, the following mixture is introduced thereinto progressively over one hour, still under an atmosphere of nitrogen:

47.5 g (0.250 mole) of titanium tetrachloride
64.5 g (1 mole) of ethyl chloride
n-heptane, to make up the volume to 200 ml The reaction medium is kept under agitation for 1 hour at 60°C. The brown-black precipitate obtained is washed several times with n-heptane. Its composition by weight is as follows: Ti: 9.4%; Mg: 19.8%; Cl: 70.8%.

b. Polymerization of ethylene

Operation is under the same conditions as in Example 1(b).

980 g of polyethylene is collected, the titanium content being 24 ppm and the index of fluidity under a load of 2.16 kg being 3.1.

c. Comparative test

Ethyl-magnesium chloride is prepared in the manner described in Example 5(a) above. The solution of ethyl-magnesium chloride in n-heptane is then raised to 60°C, and a solution of 95 g (0.5 mole) of titanium tetrachloride in 500 ml of n-heptane is progressively introduced thereinto over a span of about 2 hours. The precipitate formed is washed several times with n-heptane.

The catalyst obtained is used in the polymerization of ethylene, under conditions close to those described in Example 1(b). It is found that, in order to achieve substantially equal polymerization rates, it is necessary to use two milligram-atoms of titanium and 8 milli-molecules of triethyl aluminum.

After 8 hours of polymerization, 1,320 g of a polyethylene containing 70 ppm of titanium is obtained.

EXAMPLE 6 a. Preparation of the catalyst

Ethyl-magnesium chloride is first prepared as in Example 5(a). A 5-liter stainless steel reaction vessel provided with a mechanical stirrer and a heating or cooling means is purged by means of dry nitrogen.

The following are introduced at ambient temperature:

80 g (0.900 mole) of ethyl-magnesium chloride
n-heptane, to make up the volume to 700 ml.

After the mixture has been raised to a temperature of 80°C, the following mixture is progressively introduced therein over a span of 2 hours:

57 g (0.300 mole) of titanium tetrachloride
83.3 g (0.9 mole) of n-butyl chloride
n-heptane, to make up the volume to 400 ml.

The reaction medium is kept under agitation for 1 hour at 80°C. The brown-black precipitate obtained is washed several times with n-heptane. Its composition by weight is as follows: Ti: 10.2%; Mg: 18.5%; Cl: 71.3%.

b. Polymerization of ethylene

The following are successively introduced into a 5-liter stainless steel reaction vessel:

2 liters of n-heptane
0.8 g (4 m.moles) of triisobutylaluminum
an amount of catalyst corresponding to 0.5 milligram-atoms of titanium.

The reaction medium is heated to 75°C, and hydrogen is then introduced into the reaction vessel until the pressure is 6 bars, followed by ethylene at a flow rate of 160 g/h.

After polymerization for 6 hours, 950 g of a polyethylene having a titanium content of 22 ppm is collected. Its index of fluidity under a load of 2.16 kg is 2.8.

EXAMPLE 7 a. Preparation of the catalyst

A 1-liter glass reaction vessel provided with a mechanical stirrer, a reflux condenser and a heating or cooling means is purged by means of dry nitrogen.

The following are introduced into the reaction vessel, in a nitrogen atmosphere and at ambient temperature:

24.3 g of magnesium in powder form + an iodine crystal
300 ml of n-heptane
10 ml of sec-butyl chloride
120 ml of ethyl oxide A mixture of 110 ml of sec-butyl chloride and 100 ml of n-heptane is progressively introduced at 55°C into the reaction medium. This operation is effected dropwise, so as to keep the reaction medium under slight reflux. Once the introduction operation is concluded, the medium is kept under reflux for 1 hour by heating. Sec-butyl magnesium chloride is obtained, the major portion of which, about 70%, is dissolved in n-heptane.

Without separating the portion of sec-butyl magnesium chloride which is in suspension, 70 ml of dioxan is added. A precipitate of magnesium chloride dioxanate is formed, which is filtered and washed with a mixture of 500 ml of n-heptane and 50 ml of ethyl oxide. The filtrate and the washing solution are joined and heated to remove the ethyl oxide. In this way, a solution of 400 millimoles of di-sec-butyl-magnesium in n-heptane is obtained.

The following are introduced under a nitrogen atmosphere into a 5-liter stainless steel reaction vessel:

350 m.moles of di-sec-butyl-magnesium
n-heptane, to make up the volume to 700 ml.

After the temperature of the medium has been raised to 80°C, the following mixture is progressively introduced over a span of 2 hours:

120 m.moles of titanium tetrachloride
700 m.moles of n-butyl chloride in 400 ml of n-heptane The mixture is then maintained for 1 hour at 80°C, with agitation.

The light brown precipitate obtained is washed several times with n-heptane. Its composition by weight is as follows: Ti: 6.1%; Mg: 18.2%; Cl: 75.7%.

b. Polymerization of ethylene

Operation is under the same conditions as in Example 1(b).

1010 g of polyethylene is collected, the titanium content of which is 20 ppm and the index of fluidity under a load of 2.16 kg is 1.4.

EXAMPLE 8

Operation is as in Example 1, except that titanium tetrachloride is replaced by an equimolecular mixture of titanium tetrachloride and n-propyl titanate.

The results obtained are shown in Table I.

EXAMPLE 9

Operation is as in Example 1, except that vanadium tetrachloride is used instead of titanium tetrachloride.

The results obtained are shown in Table I.

EXAMPLE 10

2 liters of n-heptane are introduced at ambient temperature in a nitrogen atmosphere into a 5-liter stainless steel reaction vessel provided with a mechanical stirrer. After the n-heptane has been heated to 60°C, the following are introduced:

0.6 g (5 m.moles) of diethyl aluminum chloride
an amount of catalyst prepared as in Example 1, corresponding to 2 milligram-atoms of titanium.

Table I

| Example | Preparation of the catalyst | | | Polymer | |
|---|---|---|---|---|---|
| | Organo-magnesium compound (moles) | TiCl4 (moles) | Monohalogenated hydrocarbon (moles) | Weight (g) | Ti (ppm) |
| 1 | n-C$_4$H$_9$MgCl = 0.9 | 0.3 | n-C$_4$H$_9$Cl = 0.9 | 1120 | 20 |
| 2 | n-C$_4$H$_9$MgCl = 1 | 0.25 | n-C$_4$H$_9$Cl = 1 | 980 | 24 |
| 3 | n-C$_4$H$_9$MgCl = 0.9 (prepared in the presence of ethyl oxide) | 0.3 | n-C$_4$H$_9$Cl = 0.9 | 1010 | 21 |
| 4 | n-C$_4$H$_9$MgCl = 0.4 | 0.135 | n-C$_4$H$_9$Cl = 0.5 | 1050 | 22 |
| 5 | C$_2$H$_5$MgCl = 1 | 0.25 | C$_2$H$_5$Cl = 1 | 980 | 24 |
| 6 | C$_2$H$_5$MgCl = 0.9 | 0.3 | n-C$_4$H$_9$Cl = 0.9 | 950 | 22 |
| 7 | (sec-C$_4$H$_9$)$_2$Mg = 0.35 | 0.12 | n-C$_4$H$_9$Cl = 0.7 | 1010 | 20 |
| 8 | n-C$_4$H$_9$MgCl = 0.9 | (TiCl$_4$= 0.15 | n-C$_4$H$_9$Cl = 0.9 | 1030 | 20 |

Table I — Continued

| Example | Preparation of the catalyst | | | Polymer | |
| --- | --- | --- | --- | --- | --- |
| | Organo-magnesium compound (moles) | TiCl4 (moles) | Monohalogenated hydrocarbon (moles) | Weight (g) | Ti (ppm) |
| 9 | n-C$_4$H$_9$MgCl = 0.9 | (Ti(OC$_3$H$_7$)$_4$ = 0.15<br>VCl$_4$=0.3 | n-C$_4$H$_9$Cl = 0.9 | 840 | V=41 |

The reaction medium being maintained at 60°C, propylene is introduced thereinto at a flow rate sufficient to maintain the pressure at 5 bars during the polymerization step.

After 6 hours of polymerization, 410 g of polymer is collected.

We claim:

1. Catalysts for the polymerization of olefins consisting essentially of a precipitate, prepared by the reaction at a temperature within the range of —20° to 150°C in an inert solvent of (1) an aliphatic organo-magnesium compound, selected from the group consisting of compounds having the general formulae R'—Mg—X and R'—Mg—R'' in which R' and R'' represent an aliphatic hydrocarbon radical and X represents a halogen atom, (2) monohalogenated aliphatic hydrocarbon, and (3) a transition metal compound selected from the group consisting of a titanium derivative having the general formula TiX$_{4-m}$(OR)$_m$ in which X represents a halogen atom, R represents an alkyl radical having from 2–8 carbon atoms and $m$ is an integer within the range of 0–4, vanadium tetrachloride, vanadium tetrabromide, vanadium oxychloride and vanadium oxybromide the ratio between the number of atoms of the transition metal and the number of magnesium atoms of the organo-magnesium compound being up to 0.33 and the ratio between the number of organic radicals of the monohalogenated hydrocarbons and the number of organic radicals in the organo-magnesium compound is at least 1, and separating the precipitate from the reaction mixture.

2. Catalysts as claimed in claim 1 in which the halogen atom of the transition metal compound is chlorine.

3. Catalysts as claimed in claim 1 in which the monohalogenated hydrocarbon is selected from the group consisting of chloro and bromo derivatives of saturated aliphatic hydrocarbons.

4. In a method for preparing catalysts for the polymerization of olefins, preparing a precipitate by reacting (1) monohalogenated hydrocarbon, (2) an aliphatic organo-magnesium compound selected from the group consisting of compounds having the general formulae R'—Mg—X and R'—Mg—R'' in which R' and R'' represent an aliphatic hydrocarbon radical and X represents a halogen atom, and (3) a transition metal compound selected from the group consisting of a titanium derivative having the general formula TiX$_{4-m}$(OR)$_m$ in which X represents a halogen atom, R represents an alkyl radical having from 2–8 carbon atoms and $m$ is an integer within the range of 0–4, vanadium tetrachloride, vanadium tetrabromide, vanadium oxychloride and vanadium oxybromide, in which the reaction is carried out at a temperature within the range of —20° to 150°C in amounts such that the ratio between the number of transition metal atoms and the number of magnesium atoms of the organo-magnesium compound is up to 0.33, the ratio between the number of organic radicals of the monohalogenated hydrocarbons and the number of organic radicals of the organo-magnesium compounds is at least equal to 1, and separating the precipitate from the reaction mixture.

5. The method as claimed in claim 4 in which the reactants are employed in amounts such that the ratio between the number of transition metal atoms and the number of magnesium atoms of the organo-magnesium compounds is within the range of 0.25 to 0.3, the ratio between the number of organic radicals of the monohalogenated hydrocarbons and the number of organic radicals of the organo-magnesium compounds is within the range of 1 to 2.

* * * * *